Oct. 2, 1962     M. P. SCHOLZ     3,056,298

PRESSURE RESPONSIVE SWITCH FOR OIL PRESSURE GAUGE

Filed March 30, 1960

*INVENTOR.*
Michael P. Scholz
BY
Blum, Moscovitz, Friedman & Blum
ATTORNEYS

United States Patent Office 3,056,298
Patented Oct. 2, 1962

3,056,298
PRESSURE RESPONSIVE SWITCH FOR OIL
PRESSURE GAUGE
Michael Peter Scholz, Cranford, N.J., assignor to Paragon Products Corporation, Newark, N.J., a corporation of New Jersey
Filed Mar. 30, 1960, Ser. No. 18,667
4 Claims. (Cl. 73—398)

This invention relates to oil pressure gauges for automotive vehicles and, more particularly, to an improved and inexpensive replacement oil pressure responsive control unit for such gauges.

Oil pressure indicating systems for automotive vehicles are generally of one of two types. In the less expensive of these two types, generally used with the less expensive models of automotive vehicles, an indicator lamp is mounted on the dashboard and connected by conductors to a pressure responsive switch which is subjected to the oil pressure in the engine. The switch is of such a nature that, when there is oil pressure in the engine, the lamp energizing circuit is open, and when the oil pressure drops, the lamp energizing circuit is closed, so that the indicator lamp will light to indicate to the driver that oil pressure has failed. In the better, but more expensive, system, a gauge is mounted on the panel and connected by electric wiring to a suitable control unit which is subjected to the oil pressure. This control unit varies the potential applied to the gauge in accordance with variations in the oil pressure, so that the gauge indicates not only whether there is or is not oil pressure in the engine but also how much oil pressure there is.

While this latter system is much more desirable than the former system, the control unit is a relatively complicated and expensive piece of equipment which is quite frequently liable to malfunction. At such times, it has hitherto been considered the best procedure to replace the control unit with a new or re-built control unit rather than attempt to make repairs upon the same. Naturally, this involves not only expense but also substantial labor time in installing the control unit and in properly adjusting the same relative to the pressure gauge.

In accordance with the present invention, it has been found that an appropriately modified form of the usual relatively simple pressure responsive switch for controlling the indicator lamp may be utilized as a replacement unit for proper operation of the air oil pressure gauge to indicate not only whether or not there is oil pressure but also the value of the oil pressure. More particularly, the switch unit includes a two part housing with a flexible diaphragm clamped between the housings and subjected to the oil pressure in the engine. The diaphragm carries a contact member which, when the oil pressure exceeds a pre-set value, is urged into contact with a grounding washer which is in turn in contact with the metal housing of the switch. The contact member of the diaphragm is engaged by an electrically conductive coil spring which acts against the oil pressure, and the other end of this coil spring is in engagement with a resistor of appropriate size for the particular oil pressure gauge with which the unit is to be associated. At its other end, this resistor contacts a terminal member of the switch which is connected by a conductor to the oil pressure gauge.

The arrangement operates in the following manner. When the oil pressure is at or above its normal value, the diaphragm assembly is moved against the force of the coil spring so that the contact member carried by the diaphragm assembly contacts the grounding washer to establish a ground connection to the gauge. This causes the gauge to move to the position indicating normal oil pressure, and this position is determined by proper selection of the value of the resistor in the pressure responsive switch. The indicator remains in this position unless the oil pressure tends to become substantially below normal. Under these circumstances, intermittent off and on contact will occur between the contact member carried by the diaphragm and the grounding washer and this will fluctuate the needle of the oil pressure gauge toward the lower value or to the left in the usual position of such gauges. The lower the oil pressure, the less frequently will the contact member of the diaphragm contact the grounding washer so that the average value of current going to the oil pressure gauge will be decreased further and the indicating needle will move further to the left or toward the zero position. When the oil pressure becomes extremely low, the oil gauge indicator or needle will go to the zero position and will remain there until oil is added or until the oil pressure is restored by corrective measures.

For an understanding of the principles of the invention, reference is made to the following description of a typical embodiment thereof as illustrated in the accompanying drawings. In the drawings.

Figure 1:
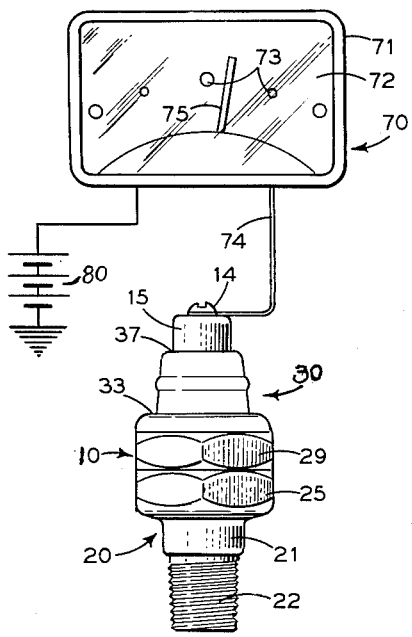
FIG. 1 is a part elevation and part schematic view of an oil pressure gauge connected to a control unit embodying the present invention.
Figure 3:
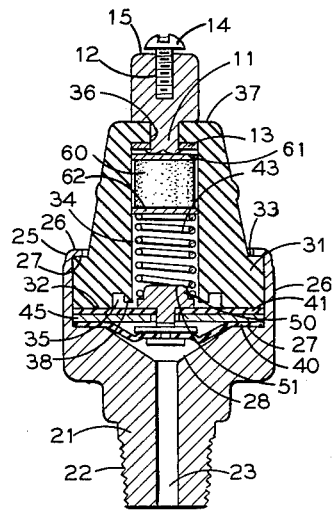
FIG. 3 is an axial sectional view through the unit in the circuit open position when there is no oil pressure applied thereto.

Referring to the drawings, an oil pressure responsive switch 10 is illustrated as controlling the indication of an oil pressure gauge 70 which may be any standard oil pressure gauge arranged for instrument panel mounting in an automotive vehicle. Gauge 70 includes a casing 71, a dial 72 provided with indicating markings 73, and an indicating needle 75. One terminal of the gauge 70 is connected to the ungrounded side of the vehicle battery 80, and the other terminal of the gauge comprises the lead 74. Gauge 70 may be of the "hot wire" type, for example, which indicates the average current flowing through the gauge.

The switch 10 comprises a conductive metal housing member 20 and a second housing member 30 of dielectric material. Housing member 20 may be formed of any suitable electrically conductive metal, such as carbon or alloy steel, brass, copper, aluminum, or the like. Housing member 30 may be formed of any suitable dielectric or non-electrically conductive material, such as Bakelite, nylon, and the like.

The metal housing member 20 includes a tubular stem portion 21 formed with external threads 22 and an axial passage 23. Stem 21 is integral with a generally cylindrical and relatively enlarged head 25 having a cylindrical flange 26 bounding a flat annular seat 27 surrounding a frusto-conical recess 28 in communication with bore 23. The exterior periphery of flange 26 is formed with flats 29 for receiving a wrench or the like for threading stem 21 into a female fitting of the lubrication system.

The dielectric housing member 30 is generally frusto-conical in form, with an enlarged substantially cylindrical base 31, providing a flat annular seating surface 32 facing seat 27 and having a shoulder 33. Member 30 has a passage on recess 34 extending axially from the larger end thereof and coaxial with a smaller diameter passage 36 through its outer end wall 37. The larger end, or base, of member 30 has an annular recess 35 therein bounded by the enlarged read 31 and by a circular lip 32 terminating slightly short of the plane of seating surface 32.

An electrically conductive terminal member 15 has a reduced stem 11 extending through passage or aperture 36 and forming a shoulder seating against the outer surface of end wall 37. The inner end of stem 11 is riveted or spun over against an electrically conductive metal washer 13 to the dielectric member 30. Terminal 15 has a threaded axial recess extending inwardly from its outer end to receive a terminal screw or binding post 14.

A circular diaphragm 40 of dielectric and flexible material is seated on the seat 27, and overlying diaphragm 40 is a ground contact washer 45 of suitable electrically conductive metal such as copper, brass, and the like. Washer 45 has a tight frictional engagement with the cylindrical wall 26 of housing member 27, and is in grounding electrical contact therewith. An insulating washer 41 overlies the ground contact washer 45 and, in the assembled condition of switch 10, is held thereagainst by engagement by the seating surface 32 of dielectric housing member 30, which is tightly secured to member 20 by turning over of the upper rim of the side wall 26 to engage the shoulder 33 of member 30.

A conductive metal stud 50 has a head 51 resting on insulator 41 and a stem 52 extending freely through apertures in the insulator 41 and in the ground contact washer 45. Head 51 is formed to provide a seat for a coil spring 43 disposed in passage 34, this coil spring being of electrically conductive metal.

A contact washer 55 is secured to diaphragm 40 by a rivet 56 having a stem extending through the diaphragm and through the washer. Rivet 56 is brazed or otherwise integrally secured to the stem 52 of stud 50. Washer 55 has a diameter substantially larger than the diameter of the central opening in ground contact washer 45 which, in turn, is substantially larger than that of the stem 52. A 6-volt or 12-volt resistor 60, which preferably has a cylindrical form, is disposed above coil spring 43 and has an electrically conductive washer 61 on its upper end engaged with stem 11 of terminal 2 and an electrically conductive washer 62 on its lower surface engaged with the upper end of spring 43.

Figure 4:
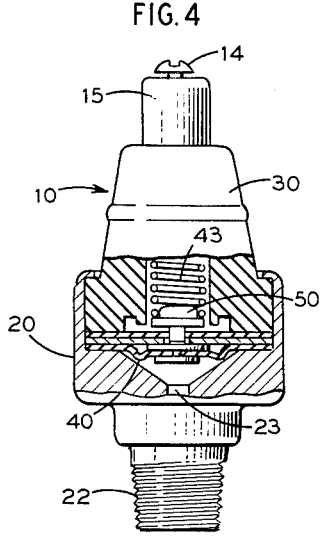
FIG. 4 is a view, partly in axial section and partly in elevation, illustrating the control unit when the oil pressure is at or exceeds the normal value.
Figure 2:
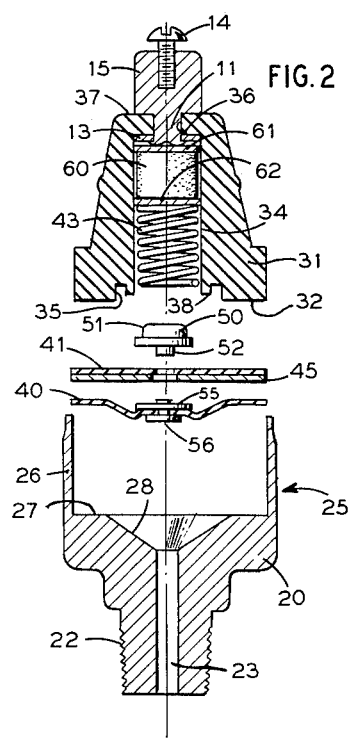
FIG. 2 is an exploded axial sectional view of the control unit.

The arrangement operates in the following manner. The device is calibrated by means of the spring 43 and the resistor 60 so that the gauge 70 will provide a normal oil pressure reading when the oil level is at its normal value. When the oil level and pressure are at or above the normal value, the pressure, through the passage 23, will act against diaphragm 40 and will move this diaphragm up, compressing spring 43. This condition of the parts is illustrated in FIG. 4. From this figure, it will be noted that washer 55 will engage washer 45 to establish a ground connection including the stud 50, spring 43, resistor 60 with its washers 61 and 62, terminal 15, conductor 74, gauge 70, and grounded battery 80. With the pressure remaining at this value, the current flowing through the gauge, as determined by the resistor 60, will be sufficient to move needle 75 to the position indicating normal oil pressure.

When the oil level drops somewhat, although remaining above the danger level, the needle 75 will fluctuate very slightly and will have an intermediate reading corresponding to an oil level between the danger level and the normal level. The make and break contacts 45, 55, under these conditions, will operate rapidly due to the rapid fluctuations in the oil pressure. This rapid operation of the make and break contacts will prevent the indicator 75 from either dropping or rising between engagements of the fixed and movable contacts of the switch. This will thus give a reading indicating an intermediate oil level.

As the oil level decreases further, indicator 75 will fluctuate but will be at a lower average reading, due to the fact that the contact "break" intervals are somewhat longer and thus the average current through the gauge 70 will be decreased. When the oil level reaches a dangerously low level, the contacts of the switch are closed only occasionally, and the indicator 75 will go to zero and fluctuate between zero and a few degrees above zero. This action will continue until the oil level becomes so low that at no time is there sufficient pressure to exceed the calibrated setting of the switch. It is only at this latter time that the oil indicator gauge 70 will remain at zero. The calibrated readings are accurate, and will indicate any danger that might exist. The accuracy of the switch is maintained at all times, whether the oil is cold, congealed, warm or thin.

The resistor 60 may be either a 6-volt or a 12-volt resistor, depending upon the particular electrical system with which it is to be used. Also, this resistor is so selected, in accordance with the characteristics of gauge 70, that the average current flowing through the gauge, when the oil pressure equals or exceeds its normal value, will be sufficient to move needle 75 to the position indicating such normal pressure.

The described switch thus provides a novel and inexpensive replacement unit for the usual control unit associated with oil pressure gauges, and has a long life due to the simplicity of its parts.

While a specific embodiment of the invention has been shown and described in detail to illustrate the application of the principles of the invention, it will be understood that the invention may be embodied otherwise without departing from such principles.

What is claimed is:

1. A control unit for an oil pressure indicating system for automotive vehicles, of the type including an electrically operated pressure gauge providing an indication responsive to the average current flow therethrough, said control unit comprising, in combination, means defining a housing including a first housing component of electrically conductive material and a second housing component of dielectric material, said housing components jointly defining a chamber constructed and arranged for connection to the vehicle oil circulating system and said electrically conductive component being arranged to be connected to the vehicle source of electric potential; a flexible diaphragm of dielectric material secured between the adjacent ends of said housing components for application of oil under pressure to one side thereof; an electrically conductive washer engaging the opposite side of said diaphragm and constituting a fixed contact in electrical contact with said electrically conductive component; a movable contact secured to said diaphragm and having a portion engageable with said washer when the oil pressure applied to said diaphragm equals or exceeds a predetermined value; means, including a coil spring in said housing, biasing said contacts out of engagement; an electric terminal on said housing insulated from said first housing component; a fixed resistor in said housing; said resistor and said coil spring being positioned and connected in series between said terminal and said movable contact; said terminal being constructed and arranged for electrical connection to a terminal of the pressure gauge; the value of said fixed resistor being such that when said contacts are maintained steadily engaged, the current flow through the resistor to a gauge connected to said terminal will provide a gauge indication of normal oil pressure; the average current flow through a gauge connected to said housing terminal, when said contacts are intermittently engaged and disengaged due to decrease in average oil pressure below such predetermined value, providing a gauge indication of less than normal oil pressure and corresponding substantially to the decreased average oil pressure.

2. A control unit as claimed in claim 1 in which said dielectric housing component has an axial recess therein, said terminal being secured to the closed outer end of said dielectric housing component and having a portion extending into said recess; said coil spring being positioned in said recess and engaged with said movable contact; said resistor being disposed between the opposite end of said coil spring and said terminal and being maintained in contact with said terminal by said coil spring.

3. A control unit as claimed in claim 2 including a dielectric washer disposed on the surface of said electrically conductive washer opposite to the surface of the latter engaged by said diaphragm; said movable contact including a stud having a head engaged by said coil spring and biased by the latter to engage said dielectric washer, said stud having a stem extending through said washers in clearance relation therewith and integrated with the portion of said movable contact secured to said diaphragm.

4. A control unit as claimed in claim 3 including a pair of electrically conductive metal disks each engaged with an opposite end surface of said resistor, one of said disks engaging said terminal and the other engaging said coil spring.

References Cited in the file of this patent
UNITED STATES PATENTS

| | | |
|---|---|---|
| 1,925,762 | Johnson et al. | Sept. 5, 1933 |
| 2,520,894 | Woods | Aug. 29, 1950 |
| 2,605,339 | Connolly | July 29, 1952 |
| 2,645,949 | DeBoisblanc | July 21, 1953 |